United States Patent [19]

Stuertz et al.

[11] Patent Number: 4,726,438
[45] Date of Patent: Feb. 23, 1988

[54] ENERGY ABSORBING FOOT REST ARRANGEMENT

[75] Inventors: Guenter Stuertz, Weil im Schönbuch; Rudolf Nock, Aidlingen; Egon Katz, Nagold; Falk Zeidler, Sindelfingen; Alban Bossenmaier, Stuttgart, all of Fed. Rep. of Germany

[73] Assignee: Daimler-Benz Aktiengesellschaft, Stuttgart, Fed. Rep. of Germany

[21] Appl. No.: 905,176

[22] Filed: Sep. 9, 1986

[30] Foreign Application Priority Data

Sep. 6, 1985 [DE] Fed. Rep. of Germany ....... 3531805

[51] Int. Cl.⁴ ............................................... B60N 3/06
[52] U.S. Cl. ....................................... 180/90.6; 296/75
[58] Field of Search ........................... 180/90.6; 296/75

[56] References Cited

U.S. PATENT DOCUMENTS

| | | | |
|---|---|---|---|
| 3,003,576 | 10/1961 | Dodge | 180/90.6 |
| 3,047,088 | 7/1962 | Murrell | 180/90.6 |
| 3,860,284 | 1/1975 | Lichtig | 180/90.6 |

FOREIGN PATENT DOCUMENTS 2312843  9/1974  Fed. Rep. of Germany .

Primary Examiner—John J. Love
Assistant Examiner—Ross Weaver
Attorney, Agent, or Firm—Barnes & Thornburg

[57] ABSTRACT

A foot-supporting body in a motor vehicle is provided which is capable of supporting both feet of a passenger while reducing the intrusion depth, reducing the change in intrusion speed and performing deformation work. The foot-supporting body is made as a pure hard-foam moulded body which—arranged on the passenger/-driver side of the end wall—extends beyond the left-hand foot-placement area at least as far as the area covered by the brake pedal. The inherent rigidity of the foot-supporting body, as viewed in the loading direction, which can be permanently deformed, is below that of the allocated area of the end wall. Polystyrene—or polyurethane—foamed plastic, with a lower volumetric-weight limit of about 20 g/dm³ is preferably used as the moulded body material in certain exemplary embodiments.

13 Claims, 2 Drawing Figures

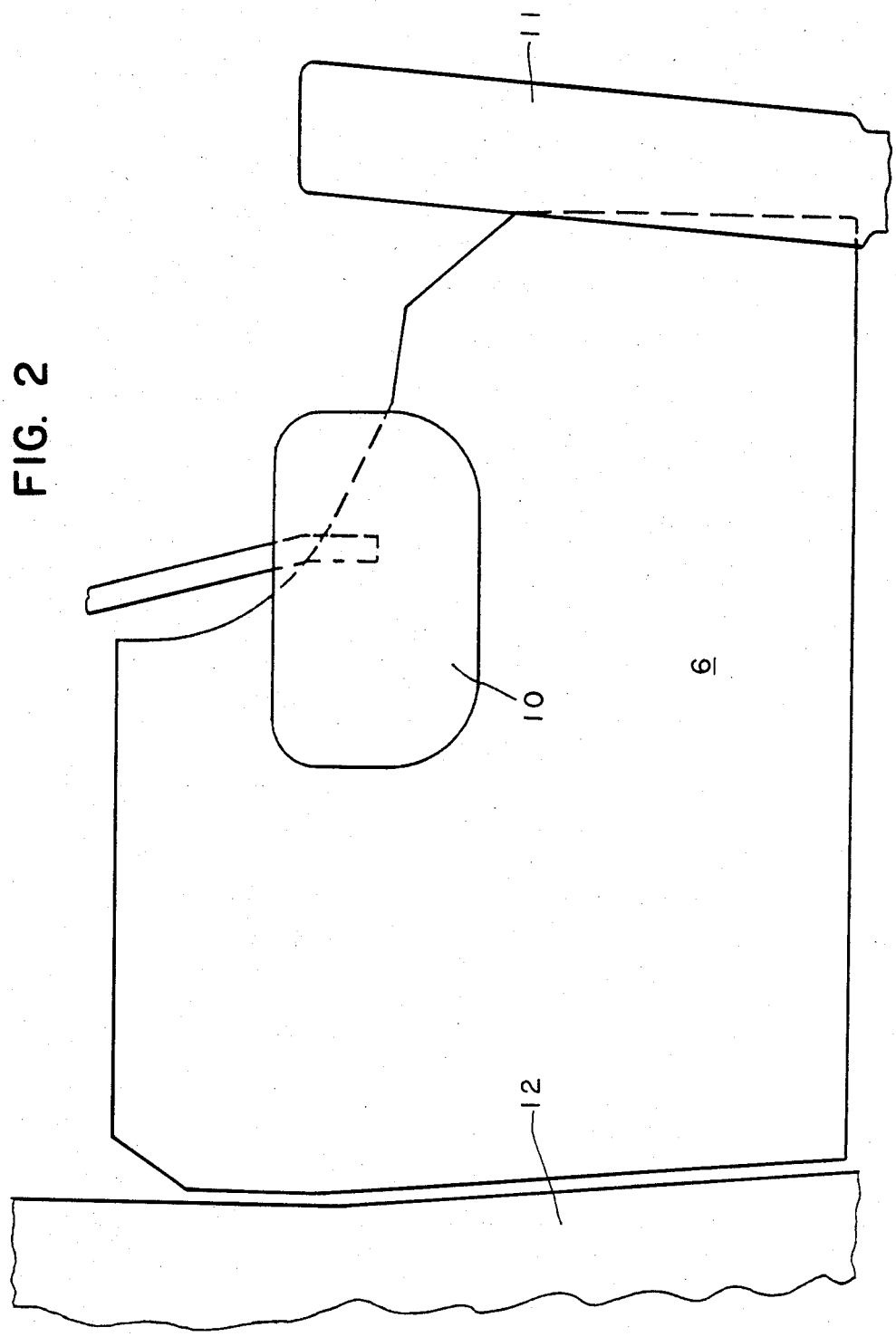

ENERGY ABSORBING FOOT REST ARRANGEMENT

BACKGROUND AND SUMMARY OF THE INVENTION

The invention relates to a foot-supporting body of energy-absorbing design for a motor vehicle. A foot-supporting body of energy-absorbing foamed plastic is arranged after the end wall on the passenger/driver compartment side, and is supported in a positionally secured manner against the end wall.

A foot-supporting body is known from U.S. Pat. No. 2,860,284, which foot-supporting body, for adaptation to various leg lengths of front-seat passengers, can be placed on the floor side from the front edge of the seat to the end wall, the intention being for the foot-supporting body to be held in its respective position via a layer covering its underside. However, the layer attached to the underside is unable, in the event of a collision, to hold in situ the foot-supporting body and the high foot-supporting forces which occur at the same time, so that it is not capable of reliably fulfilling the task intended for it. Moreover, the known foot-supporting body is only of benefit to the feet of the front-seat passenger and, when used on the driver's side, is only of benefit at most to the left foot, in which case the possibility cannot be excluded of the foot slipping off the support surface of the supporting body during a corresponding inwards movement of the end wall when the latter is deformed as a result of an accident and then striking a less protected area or an area which is not protected at all.

An object of the invention is to create a foot-supporting body which, in the event of a collision, remains in a fixed position with respect to the end wall and thereby decidedly decreases the risk of injury, and which is of benefit not only to the left foot. Further means are provided for reliably preventing slipping off of the foot supported on the body in the event of a collision.

This object is achieved by securing the foot supporting body at the end wall under the traveling path of at least one of the driver's feet. After the right foot too has slipped off or slipped forward from the pedal, it is received in the same manner as the left foot, with each foot, in the course of the plastic deformation work occurring, digging into the contact surface, allocated to each foot, of the foamed-plastic moulded body arranged in concealed manner and adapted to the shape of the end wall. Sliding off to the side is thereby prevented, a locally smaller surface pressure is achieved and therefore the risk of injury is considerably reduced. At the same time, an overall reduction in driver/passenger space intrusion depth of the contact surfaces facing towards the feet is achieved by an inherent plastic deformation occurring in the foot-supporting body, caused by the performance of the deformation work by means of the feet. Connected with this, the load in the front area and lower-leg area decreases, triggered by the longer acceleration path and the smaller change in intrusion speed associated therewith.

The moulded body is preferably made of foamed-plastic material such as polystyrene and polyurethane, with a lower volumetric-weight limit of about 20 g/dm$^3$ being taken as a basis.

The foot-supporting body can be mounted as a distance in front of both feet during normal traveling operation. This case occurs when the vehicle is equipped on the left-hand side with an attached raised foot support which, for example, is made of a material formed out of a part of the vehicle body or made of a viscoplastic material. In such a vehicle, the foot-supporting body according to the invention can be refitted in a simple manner.

However, it is also contemplated for the foot-supporting body to be acted upon only by the left foot during normal traveling operation. This takes place when the foot-supporting body extends as far as the area of the normal position of the left foot.

An especially simple assembly is provided according to certain preferred embodiments if the foot-supporting body forms a constructional unit with the floor covering.

Further objects, features, and advantages of the present invention will become more apparent from the following description when taken with the accompanying drawings which show, for purposes of illustration only, an embodiment in accordance with the present invention.

BRIEF DESCRIPTION OF THE DRAWINGS

FIG. 2 is a schematic plan view of the arrangement according to FIG. 1, in a vehicle having automatic transmission and with the carpet floor covering removed.

DETAILED DESCRIPTION OF THE DRAWINGS

Figure 1:
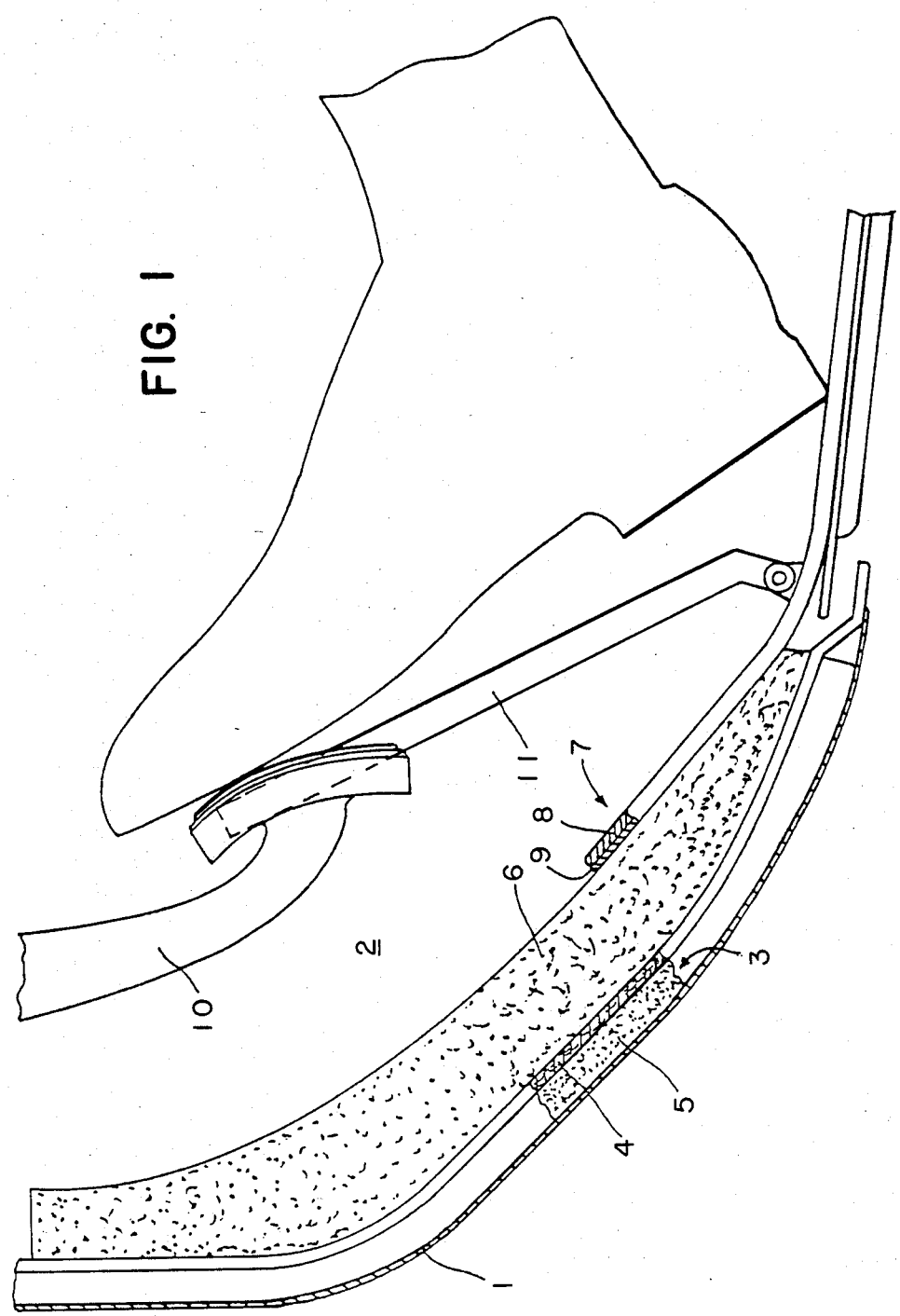
FIG. 1 is a partial sectional schematic side view of the driver-side foot space, provided with a foot support body arrangement constructed in accordance with a preferred embodiment of the invention.

A barrier covering 3 is arranged in front of an end wall 1 of a motor vehicle (not shown in greater detail) in the direction of the foot space 2. Barrier covering 3 consists of a heavy foil 4 with a polyurethane formed-plastic layer 5 interposed between same and the end wall. A foot-supporting body 6 made as a moulded body lies on the heavy foil 4, which foot-supporting body 6 consists of a hard foam, with polystyrene or polyurethane preferably being used as the material. On the driver/passenger compartment side, the foot-supporting body 6 is covered with a carpet floor covering 7, the wear layer 8 of which has an underlayer 9. Carpet covering is shown only over a portion of the body 6, it being understood that in preferred embodiments the carpet covering 7 can extend over further portions of the body 6.

While deformation work is performed, each foot—secured against sliding off further to the side—now digs into the foot-supporting body 6 with relatively slight surface pressure. The load and therefore the risk of injury to the foot area and the lower-leg area decreases because of the smaller change which occurs in the intrusion speed and because of the longer acceleration path. Apart from the described characteristics of the foot-supporting body 6 during the course of the plastic deformation which occurs, which characteristics considerably reduce the possible severity of injury, this foot-supporting body 6, in combination with the barrier covering 3 and the carpet floor covering 7 helps to increase the barrier effect during normal traveling operation.

As seen in FIG. 2, in a preferred embodiment, the body member 6 extends laterally from adjacent the accelerator pedal 11 leftward beyond the brake pedal to a raised left foot support 12 of molded plastic, for example.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Foot-supporting body arrangement of energy-absorbing design for a motor vehicle, said foot-supporting body being made of energy-absorbing foamed plastic and being arranged after the end wall, on the passenger/driver compartment side, said foot-supporting body being supported in positionally secured manner against the end wall,
   wherein the foot-supporting body is designed as a moulded body which extends beyond the placement area of the left foot and extends at least as far as the area covered by the brake pedal on the driver's side, wherein the foot supporting body is covered with a carpet floor covering on the passenger compartment side and is mounted at a distance in front of at least one of the driver's feet during normal traveling operation, and wherein the only significant deformation allowed by said body is plastic, said body absorbing a significant amount of energy during said deformation.

2. Foot-supporting body arrangement according to claim 1, wherein the moulded body is made of a foamed-plastic material such as polystyrene and polyurethane having a lower volumetric-weight limit of about 20 g/dm$^3$.

3. Foot-supporting body arrangement according to claim 1, wherein said body is mounted at a distance in front of both the driver's feet during normal traveling operation.

4. Foot-supporting body arrangement according to claim 1, wherein said body is acted upon only by the driver's left foot during normal traveling operation.

5. Foot-supporting body arrangement according to claim 1, wherein said body forms a constructional unit with the floor covering.

6. Foot-supporting body arrangement according to claim 4, wherein the moulded body is made of a foamed-plastic material such as polystyrene and polyurethane having a lower volumetric-weight limit of about 20 g/dm$^3$.

7. Foot-supporting body arrangement according to claim 5, wherein the moulded body is made of a foamed-plastic material such as polystyrene and polyurethane having a lower volumetric-weight limit of about 20 g/dm$^3$.

8. Foot-supporting body arrangement according to claim 5, wherein said body is mounted at a distance in front of both the driver's feet during normal traveling operation.

9. Foot-supporting body arrangement for protecting the feet of a vehicle driver in the event of a collision in a vehicle having an accelerator pedal and a brake pedal arranged to the left of the accelerator pedal;
   said arrangement comprising an energy-absorbing plastically deformable foamed plastic foot supporting body member disposed on an end wall which faces the bottom of the driver's feet in the area of the brake pedal;
   said body member being located at a distance from the normal foot position when activating the brake pedal;
   said foot supporting body member being fixedly secured in position and being located in front of at least one of the driver's feet during normal traveling operation wherein the only significant deformation allowed by said body member is plastic, said body member absorbing a significant amount of energy during said deformation.

10. A foot-supporting body arrangement according to claim 9, wherein said body member covered by a carpet covering securely fastened to the top thereof.

11. A foot-supporting body arrangement according to claim 10, wherein the moulded body is made of a foamed-plastic material such as polystyrene and polyurethane having a lower volumetric-weight limit of about 20 g/dm$^3$.

12. A foot-supporting body arrangement according to claim 11, wherein said body member extends laterally from adjacent the accelerator pedal leftward beyond the brake pedal to a raised left foot support of moulded plastic or the like.

13. A foot-supporting body arrangement according to claim 10, wherein said vehicle has an automatic transmission and the foot pedals for the driver are the brake and accelerator pedals.

* * * * *